(12) United States Patent
Putkowski et al.

(10) Patent No.: US 9,989,152 B2
(45) Date of Patent: Jun. 5, 2018

(54) PRESSURE RELEASED WIPER ASSEMBLY

(71) Applicant: SEAL ENGINEERING AS, Fredrikstad (NO)

(72) Inventors: Julian Putkowski, Nedgården (NO); Hans Fredrik Sandberg, Fredrikstad (NO)

(73) Assignee: SEAL ENGINEERING AS, Fredrikstad (NO)

( * ) Notice: Subject to any disclaimer, the term of this patent is extended or adjusted under 35 U.S.C. 154(b) by 0 days. days.

(21) Appl. No.: 15/321,331

(22) PCT Filed: Jul. 4, 2014

(86) PCT No.: PCT/NO2014/050122
§ 371 (c)(1),
(2) Date: Dec. 22, 2016

(87) PCT Pub. No.: WO2016/003288
PCT Pub. Date: Jan. 7, 2016

(65) Prior Publication Data
US 2017/0159820 A1    Jun. 8, 2017

(51) Int. Cl.
*F16J 15/3208*    (2016.01)
*F16J 15/06*    (2006.01)
*F16J 9/20*    (2006.01)

(52) U.S. Cl.
CPC ............ *F16J 15/3208* (2013.01); *F16J 9/20* (2013.01); *F16J 15/064* (2013.01); *F16J 9/203* (2013.01); *F16J 9/206* (2013.01)

(58) Field of Classification Search
CPC .......... F16J 15/3208; F16J 9/20; F16J 15/064; F16J 9/203; F16J 9/206
See application file for complete search history.

(56) References Cited

U.S. PATENT DOCUMENTS 1,401,930 A * 12/1921 Wainwright ............... F16J 9/20
    123/190.17
1,617,229 A *  2/1927 Young ....................... F16J 9/20
    277/462

(Continued)

FOREIGN PATENT DOCUMENTS

EP    1 209 384 A1    5/2002
GB    2 217 625 A    11/1989

*Primary Examiner* — Eugene G Byrd
(74) *Attorney, Agent, or Firm* — Birch, Stewart, Kolasch & Birch, LLP (57) ABSTRACT

A wiper-seal assembly for a cylinder with a cylinder wall and with a relative movable rod/piston rod with a piston wall is arranged for mounting in a ring-shaped groove in a cylinder wall or a rod/piston rod wall in front of a sealing or a steering. The wiper-seal assembly includes a ring-shaped wiper with one or more wiper sealing lip portions against the opposite relatively moving cylinder wall or the rod/piston rod wall. The wiper is further arranged for fluid transport from a gap between the cylinder wall and the rod/piston rod wall outside the ring shaped groove through pressure releasing flow conduits and further to the gap between the cylinder wall and the piston rod wall outside and at the opposite side of the ring shaped groove, and where the wiper-seal assembly further includes one or more filters.

18 Claims, 9 Drawing Sheets

(56) References Cited

U.S. PATENT DOCUMENTS

| | | | | |
|---|---|---|---|---|
| 2,456,529 A * | 12/1948 | Naab | ............... | F16J 9/28 277/545 |
| 3,140,902 A * | 7/1964 | Herbst | ............... | F16J 15/104 277/345 |
| 3,268,235 A * | 8/1966 | Jacobellis | ............... | F16J 15/32 277/468 |
| 3,277,796 A * | 10/1966 | King | ............... | F01C 1/063 277/389 |
| 3,814,445 A * | 6/1974 | Bitzan | ............... | F16J 15/32 277/451 |
| 4,151,999 A * | 5/1979 | Ringel | ............... | F16J 15/32 277/589 |
| 4,615,261 A * | 10/1986 | Meijer | ............... | F02G 1/0535 277/471 |
| 4,796,858 A * | 1/1989 | Kabel | ............... | F16K 5/182 137/860 |
| 5,332,236 A | 7/1994 | Kastuhara et al. | | |
| 5,423,557 A * | 6/1995 | De Villepoix | ............... | B64C 9/00 277/345 |
| 5,467,705 A * | 11/1995 | Daniel | ............... | B30B 15/0052 100/214 |
| 5,755,446 A * | 5/1998 | Dean | ............... | F16J 15/164 277/358 |
| 6,237,466 B1 * | 5/2001 | Fukuhara | ............... | F01L 1/3442 92/125 |
| 9,599,226 B2 * | 3/2017 | Putkowski | ............... | F16J 15/064 |
| 2007/0063452 A1 * | 3/2007 | Kurth | ............... | F16J 15/064 277/572 |
| 2007/0158917 A1 | 7/2007 | Paykin | | |
| 2010/0084820 A1 * | 4/2010 | Maeda | ............... | F16J 15/3208 277/500 |
| 2010/0133757 A1 * | 6/2010 | Maeda | ............... | F16J 15/3208 277/436 |
| 2010/0322541 A1 * | 12/2010 | Navarra Pruna | ............... | F16J 15/3208 384/130 |
| 2011/0012312 A1 * | 1/2011 | Zitting | ............... | F16J 15/164 277/500 |
| 2012/0235360 A1 * | 9/2012 | Maeda | ............... | F16J 15/16 277/500 |

* cited by examiner

Fig. 9a

DETAIL B
Fig. 9c

SECTION A-A
Fig. 9b

DETAIL B
Fig 11a

Fig 11b

PRESSURE RELEASED WIPER ASSEMBLY

INTRODUCTION

The invention is a pressure released wiper-seal assembly for a sealing arrangement, wherein the wiper-seal assembly is placed in front of a sealing device or a steering arrangement and serve to keep the sealing and or steering arrangements clean.

More specific, the invention is a pressure released wiper-seal-filter assembly for a cylinder sealing arrangement, primary for hydraulic cylinders but to other systems as well, rotating or static and also e.g. for pneumatic systems etc, wherein the wiper arrangement is placed in front of a cylinder packer and serve to keep contaminants and impurities such as metal pieces, plastic ships and other impurities away from the cylinder seal.

PRIOR ART

Sealing devices are used in a lot of industrial applications and operating conditions. The effect of a seal and its lifetime depends of that it maintains unbroken, undamaged and got a minimal of wear. This is to a certain degree prevented by adapted material to the surrounding conditions of the installed sealing device and the operating conditions for the sealing arrangement. A sealing arrangement in a movable system will generally have a lubrication film. The thickness of the lubrication film and the type of fluid is totally dependent on the industrial application, type of movement, speed, pressure, temperature and chemical conditions. In any case, the lubrication film may contain impurities in the form of particular material either brought in from the outer environment or occurred internally in the machinery caused by abrasion. Such particular material may damage a sealing device when it comes with the lubrication film. A damaged seal has to be replaced not to cause breakdown of the equipment, often with serious consequences, all depended of the process equipment in which the seal is arranged.

Most of industrial equipment comprises parts where a sealing is involved, either hydraulic, pneumatic or other equipment in the range from hospital apparatus, production machinery, cranes, windmills and to equipment for large heavy industries such as petroleum exploitation. Some examples of sealing devices are linear rotating hydraulic and pneumatic actuators.

To ensure, or extend, the lifetime of a sealing the fluid which act as a lubrication film must be kept clean. This may to a certain degree be carried out by the use of wipers but may also be done by filtering the fluid.

Such a filter solution is described in GB2217625A. Described here is a filter fixed between an inner and an outer support ring arranged to be coupled with a sealing device to a complete sealing arrangement and then to be mounted as a fully replacement for a seal.

Another sealing arrangement with a filter for sealing against a shaft is described in US 2007/0158917A1. This is a combination product by a seal with a filter arrangement integrated in the same unit, complex, and assembled by many elements and arranged to be mounted as a replacement for a conventional seal. Primarily intended for the motor industry.

Common to the prior art is that the filter unit is coupled to the sealing unit in such way that both the filter unit and the sealing unit are special designed to each other in a way that it complicates both production and maintenance. During maintenance the sealing unit also is affected. To install a filter at a later stage is not possible without affecting the whole sealing arrangement.

SHORT SUMMARY OF THE INVENTION

The invention is a plain solution to the problems above and is a pressure released wiper with a filter, a wiper-seal assembly for a sealing arrangement wherein the pressure released wiper-seal assembly with filter is free-standing and placed in front of a sealing or steering arrangement and serve to keep a fluid flowing towards a sealing and or steering arrangement clean and thus the sealing or steering arrangement clean. The wiper-seal assembly is not constituting the actual sealing. The wiper-seal assembly comprises a main body of a wiper and at least a donut shaped filter ring with filtering properties. The filter ring is held in place in a groove either by its own force or by the wiper. The wiper-seal assembly may in an embodiment be mounted into a rod/piston rod wall and in another embodiment be mounted into the cylindrical wall. The rod/piston rod wall and the cylinder wall may rotate or have a reciprocal movement respective to each other or both rotating and reciprocal.

More specific the invention is a wiper-seal assembly (1) for a cylinder (1010) with a cylinder wall (10) and with a relative movable rod/piston rod (1009) with a piston wall (9), wherein the wiper-seal assembly (1) is arranged for mounting in a ring-shaped groove (15) in a cylinder wall (10) or a rod/piston rod wall (9) in front of a sealing or a steering and comprises a ring-shaped wiper (2) with one or more wiper sealing lip portions (6, 6a, 6b, . . . ) against the opposite relatively moving cylinder wall (10) or the rod/piston rod wall (9), wherein the wiper (2) is further arranged for fluid transport from a gap between the cylinder wall (10) and the rod/piston rod wall (9) outside the ring shaped groove (15) through a plurality of pressure releasing flow channels (16) in the flow direction and even distributed at the surfaces of the wipers (2) facing the walls (151, 153)

and further to the gap between the cylinder wall (10) and the piston rod wall (9) outside and at the opposite side related to the fluid flow in the direction towards the seal or the steering, of the ring shaped groove (15), and wherein the wiper-seal assembly (1) further comprises—one or more filters (3) tight-fitting arranged between the wiper (2) and the cylinder wall (10) or the rod/piston rod wall (9) in the groove (15), arranged for filtering a fluid (1112) flowing through.

The invention consists of few components and is simple to produce and to assemble, and may be mounted in existing equipment without any special accommodation. It is, by its flow through channels and filter, pressure released. In an embodiment the wiper-seal-filter assembly will be mounted in the cylinder wall and in another embodiment it will be mounted in a rod/piston rod wall.

The filter may be produced as a separate unit and the type of filter may be freely chosen dependent of the surroundings and the aim of the process where the assembly will be arranged without special manufacturing of the total assembly.

In an embodiment of the wiper-seal assembly the lip portion (6, 6a, 6b . . . ) has a chamfering (61, 62) towards the surface (9, 10) on which the lip portion bear against. The chamfering forms an obtuse angle to the surface it bear against, and this angle regulates the film thickness on the gliding surface, the lubrication film. The lip portion works as a wiper-seal and it guides the potential contaminated fluid into the assemblies flow channel and through the filter (3,33,34,35,36,37,38) and back to the movable surface. A very thin lubrication film will remain at the movable element. This property is a further advantage to the invention.

FIGURE CAPTION

FIG. 1b to 1f shows details of the wiper (2) according to an embodiment of the invention for assembling in a groove (15) in a rod/piston rod wall (9). The conduits (16) illustrated in the figure will be similar for all the embodiments of the invention but not shown in the FIGS. 1a and 2 to 10. There will be a plurality of conduits evenly distributed along the wiper-seals sides facing towards the walls (151, 152) of the groove (the walls are not shown in this figure).

FIG. 1b is a top view of the wiper (2) according to an embodiment of the invention.

FIG. 1c is a section cut A-A' in FIG. 1b and shows a distribution of the conduits (16) on both sides of the wiper (2) and offset to each other. Such distribution is advantageous to at a largest possible degree prevent plugging of the conduits (16) during operation.

FIG. 1f shows the conduits in a detail cut. The wiper (2) and the conduit (16) are not drawn in accurate scale for a better illustration of the conduits (16).

FIG. 2 shows a wiper-seal assembly (1) according to an embodiment wherein the wiper-seal assembly is arranged in a cylinder wall (10).

FIG. 2b shows the section cut A-A' in FIG. 2a

FIG. 5 shows a wiper-seal assembly (1) according to the invention where the wiper-seal assembly is arranged in a piston rod wall.

FIG. 5b shows the section cut A-A' in FIG. 5a

FIG. 8 shows a filter ring (33) according to the invention in different embodiments.

FIG. 8b shows the section cut A-A' in FIG. 8a

FIG. 9 shows an embodiment of the wiper-seal assembly (1) according to the invention, not shown arranged in a groove, and where the filter ring (33) with a filter (3) has a non-circular cross section.

FIG. 9b shows the section cut A-A' in FIG. 9a

EMBODIMENTS OF THE INVENTION

The invention is a plain solution to the problems by the prior art both for filter and sealing arrangements and is a wiper-seal-filter assembly for a sealing arrangement wherein the wiper-seal-filter assembly is free-standing and arranged in front of a sealing and serves to keep the environment for the sealing or the steering arrangements clean. The wiper-seal-filter assembly comprises a main body with wiper-seal and at least a filter. The wiper-seal-filter assembly may be mounted into a rod/piston rod and in another embodiment be mounted into the cylindrical wall where a rod or a piston rod runs through.

The wiper-seal assembly is designed to fit into a groove. Such groove may for instance be a similar grove wherein a general wiper-seal or an additional sealing arrangement should have been placed or be a special designed groove for the wiper-seal-filter assembly.

In an embodiment the invention is a wiper-seal-filter assembly (1) for a cylinder (1010) with a cylinder wall (10) and with a mutual movable rod or piston rod (1009) with a piston wall (9), wherein the wiper-seal assembly (1) is arranged for mounting in a ring shaped groove (15) in the cylinder wall (10) or the piston wall (9) in front of a seal or a steering and comprises a ring shaped wiper (2) with
one or more sealing, wiping, lip portions (6, 6a, 6b, . . . ) to the opposite mutual movable cylinder wall (10) or piston wall (9),
wherein the wiper (2) is further arranged for fluid transport from an aperture between the cylinder wall (10) and the piston rod wall (9) outside the ring shaped groove (15) through—a pressure releasing conduit (1111) formed between the wiper (2) and the walls (151, 153) and the bottom (152) of the groove (15), to the gap between the cylinder wall (10) and the piston wall (9) outside and on the opposite side, related to the fluid flow towards the sealing or the steering, of the ring shaped groove (15), through
a plurality of pressure releasing flow channels (16) in the flow direction and even distributed at the surfaces of the wipers (2) facing the walls (151, 153),
and further to the gap between the cylinder wall (10) and the piston rod wall (9) outside and at the opposite side related to the fluid flow in the direction towards the seal or the steering, of the ring shaped groove (15)
and wherein the wiper-seal assembly (1) further comprises—one or more filters (3) tight-fitting arranged between the wiper (2) and the cylinder wall (10) or the rod/piston rod wall (9) in the groove (15), arranged for filtering a fluid (1112) flowing through.

The fluid is in this way kept clean towards the sealing or the steering that the invention is arranged to protect, and thus holds the sealing and the steering clean. This prevents impurities to damage arrangements like piston rod and/or pistons rods that, if damaged, may destroy the cylinder and thus cause production stop for the production plant for which it is installed, such as offshore installations, wind mills and so on, until the damaged parts are repaired or replaced. Such production stops are extremely costly. In an embodiment of the invention the wiper-seal assembly will have the wiper part against the center of its ring shape with the filter ring in the periphery of the arrangement. Such embodiment is arranged for mounting in a groove (15) in a cylinder wall (10). In another embodiment of the invention the wiper (2) will be arranged in the periphery and the filter ring arranged towards the center of the arrangement. Such embodiment is arranged for mounting in a groove (15) in the rod or piston rod wall (1009).

The wiper-seal assembly is an additional unit for a cylinder sealing arrangement, primarily for hydraulic cylinders but for other systems as well. Such systems may be rotating or static systems and for instance pneumatic systems etc as well. Characteristic for the invention is that the filter arrangement is placed in front, at the potential contaminated side of a cylinder sealing or steering and serve to keep contaminants and impurities such as metal pieces, plastic ships and other impurities away from the cylinder sealing or steering. The wiper-seal assembly may also be used for systems where the cylinder is a re-bore in a block.

All the properties and embodiments referred below will be valid for both the above mentioned aspects, in other words both the invention arranged in the cylinder wall and the invention arranged in the rod or piston rod.

With the lip portion and the adjacent portions pointed towards the moving element in the assembly the lip portion works as a wiper and at the same time guide the potential contaminated fluid, for instance hydraulic oil, into the conduit and through the filter (3) back to the movable rod/piston rod wall (9) or the cylinder wall (10). A very thin lubrication film will remain at the movable element.

Figure 10A:
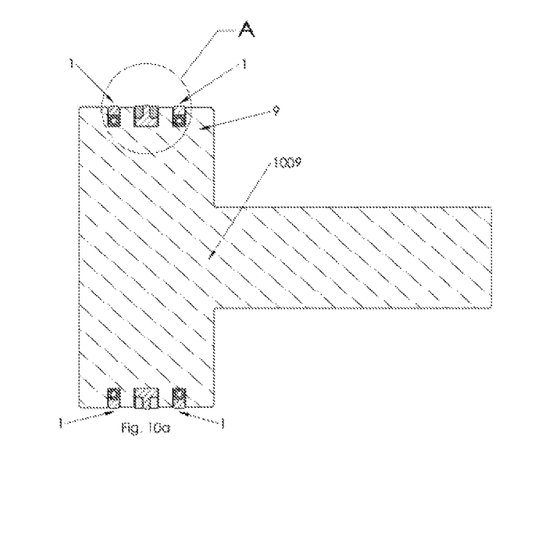
FIG. 10 shows an embodiment of the wiper-seal assembly (1) according to the invention wherein the wiper-seal assembly is arranged in a piston rod and on both sides of a seal.
Figure 10B:
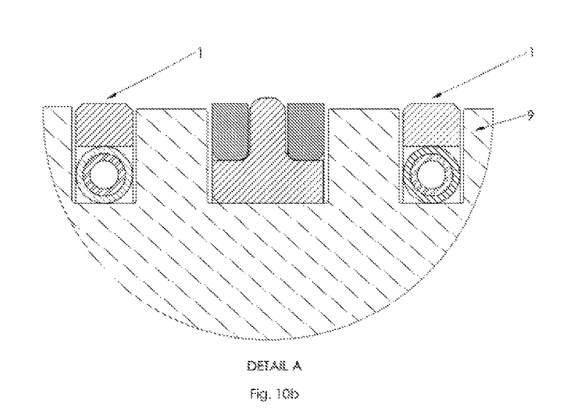

An advantage by the invention is, distinct from prior art, that it may be mounted into existing equipment such as in a space designed for a regular wiper-seal. The invention is not a replacement for a sealing unit but is a supplement to a seal to prevent that the seal and adjacent components in the system are unnecessary worn due to impurities in the fluid. Due to the through running conduits pressures build up is prevented, and they do also ensure self-cleansing by the reciprocal movement of the equipment, wherein such wiper arrangements of the invention is specially advantageous. Distinct to prior art wherein a filter is an integrated part of the sealing the wiper-seal assembly of the invention may be replaced without replacing the sealing. Another advantage by the invention is that it has a simple design with few components and is easy to manufacture. A further advantage is that one may arrange more filtering units in connection to the sealing, please see FIG. 10.

In an embodiment of the invention the wiper-seal assembly is mounted in a cylinder arrangement wherein the cylinder wall and the piston rod wall has a mutual rotating movement.

In another embodiment the cylinder wall and the piston rod wall has a mutual reciprocal movement.

In another embodiment the cylinder wall and the piston rod have both a rotating and reciprocal mutual movement.

In an embodiment of the wiper-seal assembly (1) according to the invention the conduits (16) facing against the wall (151) offset the conduits (16) facing the wall (153). This is well illustrated in FIG. 1b to 1f showing details of an embodiment of the invention for assembling in a groove (15) in a rod/piston rod wall (9). The conduits (16) illustrated in the figure will be similar for all the embodiments of the invention, independent of mounting in a cylinder or piston rod wall, and independent of design of lip portions and filters. There will be a plurality of conduits evenly distributed along the wiper-seals sides facing towards the walls (151, 153) of the groove. Such distribution is advantageous for to a largest possible degree, prevent plugging of the conduits (16) during operation. The conduits will, during operation, when the system is present to a fluid and pressure, ensuring fluid inflow in the one side, passing the wiper and through the filter arranged between the wiper and the bottom (152) of the groove (15) and flowing out at the other side of the wiper. The wiper will, during operation, be pressed against the wall (151, 153) in the flow/press direction and the conduits (16) ensure maintenance of fluid flow and pressure release to the wiper.

In an embodiment of the invention the wiper-seal assembly according to the invention is mounted in the groove (15) placed in the cylinder wall (10). This will be the location when there is a continuous sliding surface of a rod or a piston rod for which the lip portion (6) bear against. For instance in a cylinder wall for a passing piston rod. Please see FIG. 11 Here the wiper arrangement stays in place in the groove.

Figures 11A, 11B:
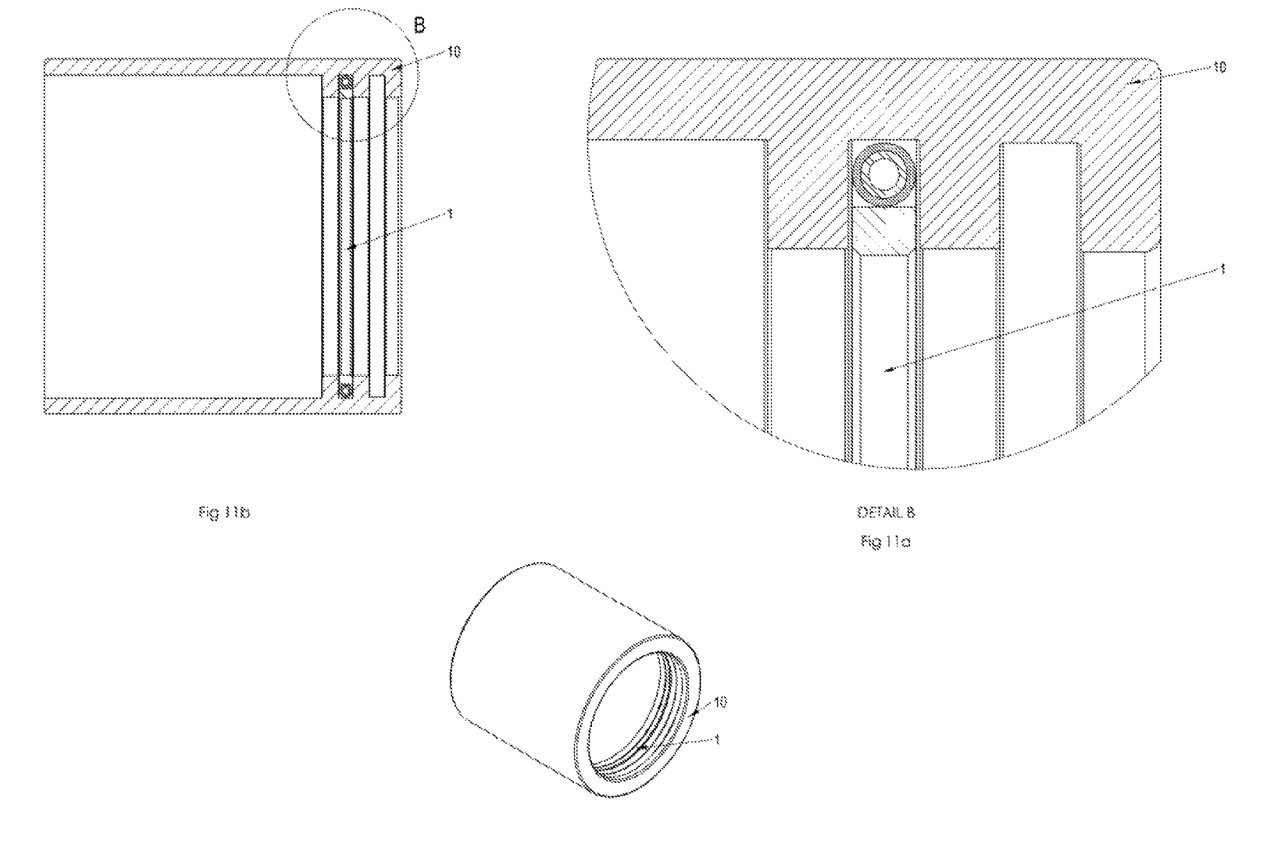
FIG. 11 shows an embodiment of the wiper-seal assembly (1) according to the invention where the wiper-seal assembly is arranged in a cylinder wall for wiping against the relative movable rod.
Figure 12:
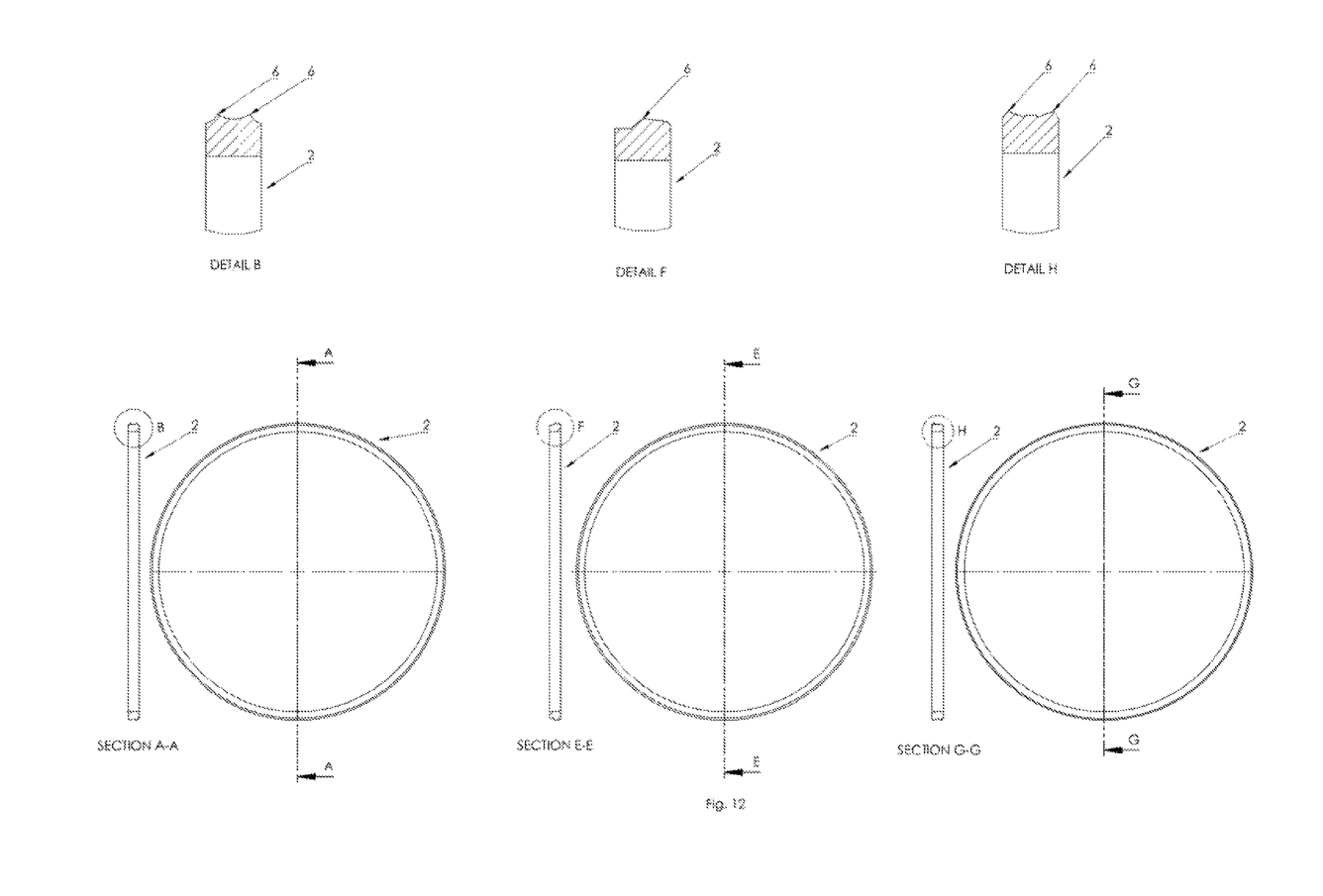
FIG. 12 shows a top view, section cut and detail drawings of different embodiments of the wiper (2) with different embodiments of the lip portion (6).

If such wiper-seal assembly is used in the piston rod cylinder the wiper-seal assembly may be arranged in the groove (15) in the piston rod wall (9), please find FIG. 11.

For both the above mentioned embodiments the lip portion will have a continuous opposite bearing surface and ensure a correct lubrication film and wiping.

The filter (3) of the wiper-seal assembly according to an embodiment of the invention is a flexible permeable filter ring (33). This is arranged between the wiper (2) and the bottom (152) of the groove and will, due to its height (H3), fill the full height (H15) so that all the fluid entering the conduit (1111) is forced through the filter and particles and impurities are retained.

Embodiments of the filter ring are independent of wiper embodiments except from the height ratio mentioned above. Different filter embodiments for the invention are described below.

In an embodiment of the invention the filter ring (33) has an inner core ring (34, 37, 38) and one or more enveloping tube rings (35, 36) and at least one of the rings (34, 35, 36, 37, 38) is arranged to filter the through flowing fluid (1112).

In an embodiment of the invention the filter rings (33) have an inner core ring (34) shaped like an annular spring arranged to support at least one rim filter (35). Such solution may provide great flexibility to diameter and type of filter. An annular spring like this with a rim filter may be formed as a flexible accordion-like ring-shaped tube and may thus possibly be pre-produced with less diameters than for an embodiment with locked diameter.

In an embodiment of the invention the filter ring (33) is a flexible permeable filter ring (33). Such filter ring may be permeable or semi permeable and may have a filled look and the material choice is based on the surrounding operating conditions.

In an embodiment of the invention the e filter ring (33) has an inner core ring (34) with a permeable or semi permeable material (38) with a perforated rim tubing (35). Such embodiment will be advantageous where there is a need for a form-fixed filter.

In an embodiment of the invention, especially in combination to a filtering of several rim rings, the core ring may be hollow. Then the rim rings may be the filtering ones.

In an embodiment of the invention in combination to any of the filter embodiments or wiper (2) embodiments, the filter (3) has a circular cross section. In another embodiment the filter has a non-circular, e.g. square, cross section. Please see FIG. 8 and FIG. 9 for examples of such embodiments.

Independent from the filter (3) and the filter rings (33) embodiments the wiper may have different shapes. In an embodiment of the invention the wiper-seal assembly has at least one lip portion (6, 6a, 6b, ...) in the wipers (2) inn and out flowing direction, a chamfered portion (61, 62). Please see FIG. 2. The chamfering forms an obtuse angle to the surface it bear against. The lip portion works as a wiper and it guides the potential contaminated fluid into the assembly conduit (1111) and through the filter (3) and back to the movable surface. A very thin lubrication film will remain at the movable element. This property is a further advantage to the invention. The lip angle is regulating the thickness of lubrication film.

Figure 1A:
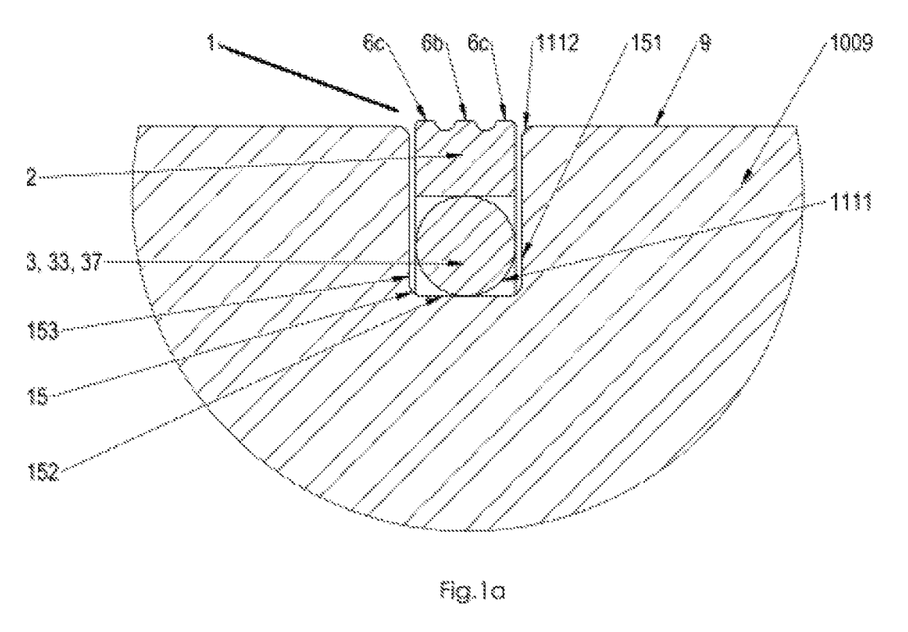
FIG. 1a is a partly section cut and perspective view and shows the wiper-seal assembly (1) according to an embodiment of the invention in place in a groove (15) in a piston rod wall (9) at a piston (1009). The figure shows the wiper (2) with an embodiment wherein 3 sealing lip portions (6a, 6b, 6c) for sealing against a cylinder wall (not shown) in a cylinder arrangement. The figure shows a flow path for a fluid (1112), a lubrication, in the direction of the arrow and towards a possible gasket or steering in the cylinder arrangement (not shown). Between the wiper-seal and the groove walls (151, 153) and the bottom (152) the conduit (111) wherein also a filter ring (3, 33) with one ring layer (37) of a permeable material is shown.
Figure 1B:
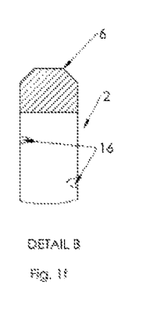
Figure 1C:
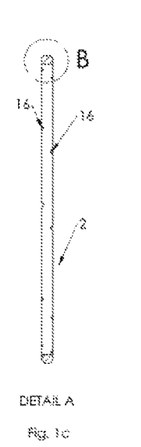
Figure 1D:
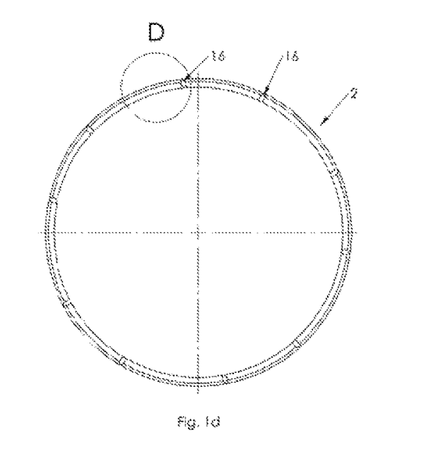
Figure 1E:
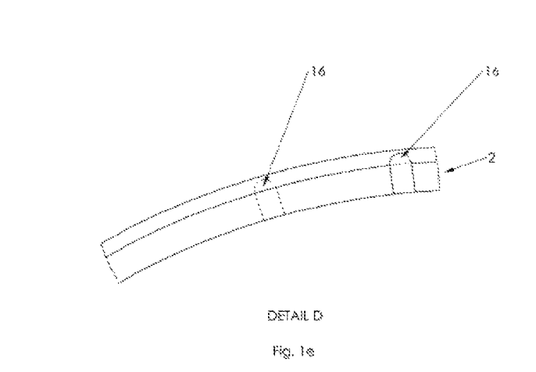
Figure 2A:
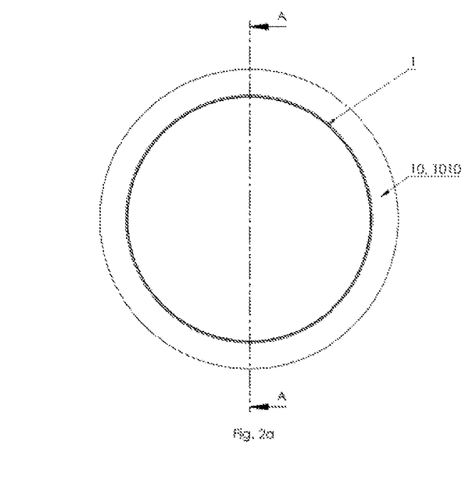
FIG. 2a is a top view of an embodiment of the invention.
Figure 2B:
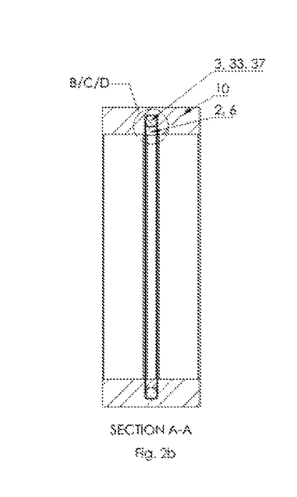
Figure 2C:
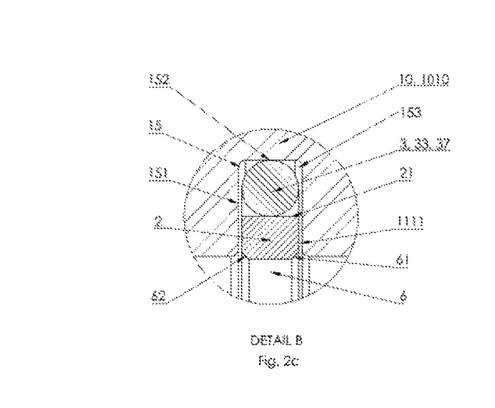
FIG. 2c is a detail drawing and shows the section B in FIG. 2b and illustrates the wiper (2) with an unbroken lip portion (6) for tight-fitting to a rod or a piston rod. The lip portion (6) has in this embodiment a width like the total width of the wiper-seal from the fore edge (61) at the inflow side and the chamfered rear edge (62) at the outflow side. The filter ring (3, 33) is shown with only one ring layer (37) of a permeable material.
Figure 3:
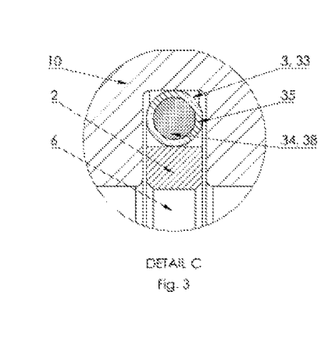
FIG. 3 shows an equivalent detail as in FIG. 2 but here in an embodiment where the filter ring (33) is formed by an inner core ring (34) of a permeable/semi permeable material (38) with an enveloping perforated tube (35).
Figure 4:
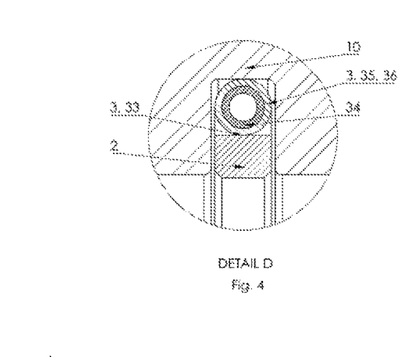
FIG. 4 shows an equivalent detail as in FIG. 2 and FIG. 3 but here in an embodiment where the filter ring (33) is formed by an inner core ring (34) as a spring supporting an enveloping filter (3, 35).
Figure 5A:
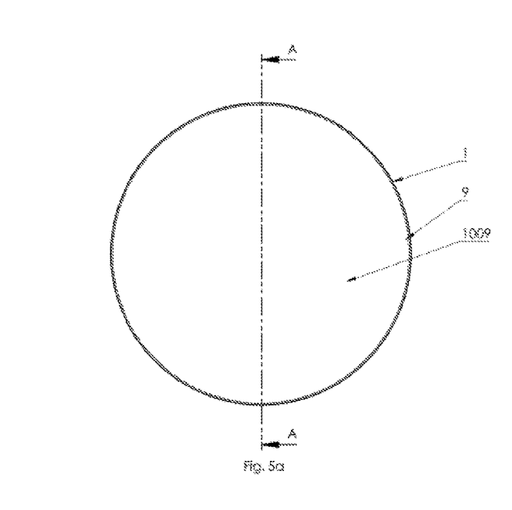
FIG. 5a is a top sketch of an embodiment of the invention.
Figure 5B:
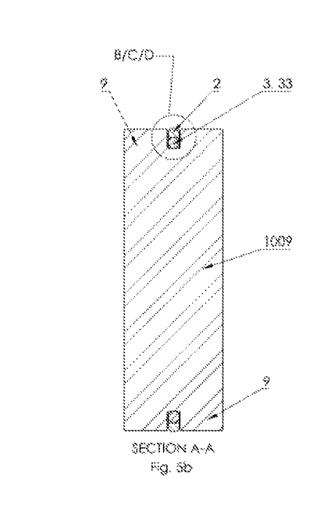
Figure 5C:
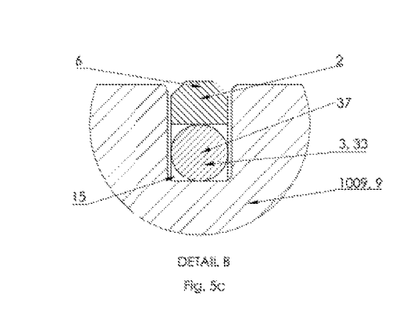
FIG. 5c is a detail drawing and shows the section B in FIG. 5b and shows the wiper (2) with an unbroken lip portion (6) as shown in FIG. 2. The filter ring (3, 33) is shown with only one ring layer (37) of a permeable material.
Figure 6:
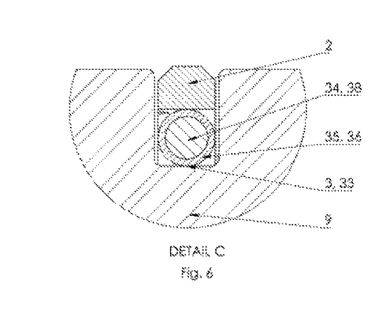
FIG. 6 shows an equivalent detail as in FIG. 5 but here in an embodiment where the filter ring (33) formed by an inner core ring (34) of a permeable/semi permeable material (38) with a perforated rim tube (35) as the embodiment for arrangement in the cylinder wall (10).
Figure 7:
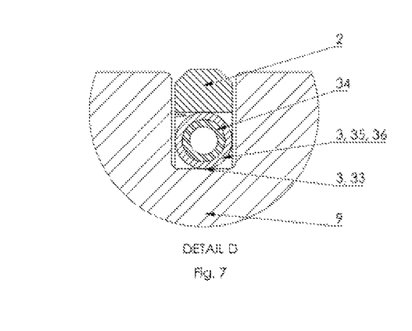
FIG. 7 shows an equivalent detail as in FIG. 5 and FIG. 6 but here in an embodiment where the filter ring (33) is formed by an inner core ring (34) as a spring supporting an enveloping filter (3, 35) as for the embodiment for arrangement in the cylinder wall (10).
Figure 8A:
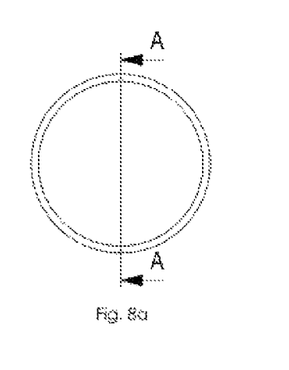
FIG. 8a is a top sketch of a filter ring (33)
Figure 8B:
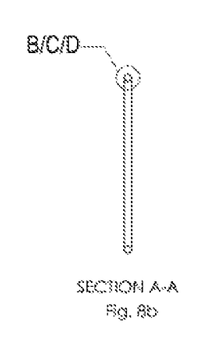
Figure 8C:
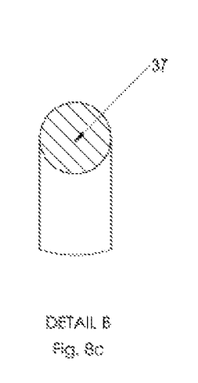
FIG. 8c shows the section B in FIG. 8b according to an embodiment of the invention and shows a filter ring with simply one ring layer (37) of permeable material.
Figure 8D:
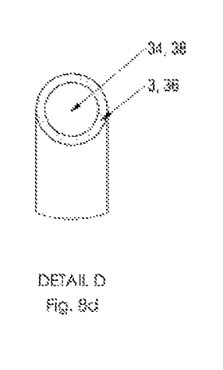
FIG. 8d shows the alternative C of the detail in FIG. 8b according to an embodiment of the invention where the filter ring (33) is formed by an inner core ring (34) of a permeable/semi permeable material (38) with an enveloping perforated tube (35).
Figure 8E:
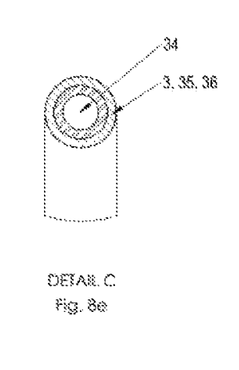
FIG. 8e shows the alternative D of the detail in FIG. 8b according to an embodiment of the invention where the filter ring (33) is formed by an inner core ring (34) e.g. a spring supporting an enveloping filter (3, 35).
Figure 9A:
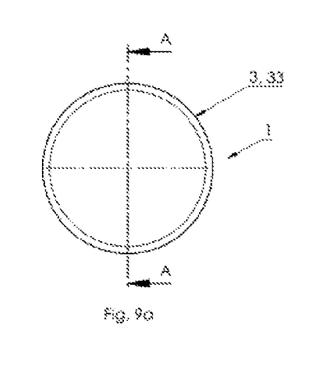
FIG. 9a is a top view of an embodiment of the invention.
Figure 9B:
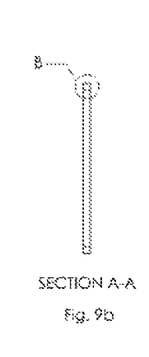
Figure 9C:
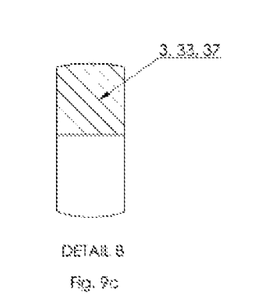
FIG. 9c is a detail drawing and shows the section B in FIG. 9b and shows the wiper (2) with an appurtenant non circular filter (3).

In an embodiment of the invention there is only one lip portion (6) In another embodiment of the invention it is more lip portions distributed over the width of the wiper. A wiper like this may have different designs. Some examples are shown in FIG. 1, FIG. 2 and FIG. 9.

Then it becomes easy to pre produce and e.g. mass-produce the separate units for, to later on, choosing the suitable mesh sizes and spring design depended on the kind of application, fluid type, pressure and temperature conditions etc. where the invention is to be used.

In an embodiment of the wiper-seal assembly the filter ring (33) and the wiper (2) may be coupled together, e.g. molded or glued to one unit. In this way the invention will consist of even fewer separate parts and will be even easier to assemble than the embodiment with for instance 2 separate units.

The invention consists of few parts and is simple to produce and to mount and may be mounted to existing equipment without any special accommodation.

The invention is well suited for mounting in existing equipment with a minimum of adjustments.

The wiper-seal assembly according to the invention is e protective and filtering unit for a fluid seal, wherein the filtering wiper arrangement is placed on the pressure side of the fluid seal.

The filter arrangement of the invention is well suited for a cylinder sealing arrangement, primary for hydraulic cylinders but to other systems as well, rotating or static and also e.g. for pneumatic systems etc, wherein the filter arrangement is placed in front of a packer and serve to keep contaminants and impurities such as metal pieces, plastic ships away from the packer. The wiper-seal assembly according to the invention is well suited for a reciprocating piston/cylinder assembly but may as well be used for a rotating system.

The wiper-seal assembly (1) according to the invention may be used in an arrangement at a piston rod e.g. at both sides of the seal or the steering. Please see FIG. 10. The filtering wiper-seal assembly will in such arrangement protect the seal from potential impurities form both the outside and the inside of the system of which it is mounted.

The arrangement is mainly a ring shaped filter assembled together with an adjusted wiper-seal. The filter may be a filter cloth, a grid "mesh" or another suitable permeable material. The filter is made of a suitable filter cloth material or as a permeable compact ring with a circular or non-circular cross section. The filter arrangement may be used in front of seals for all applications as single-acting or double acting piston cylinders where a pressure or alternatively, vacuum, is used for operating. The filter assembly may be used for small systems as for instance instruments for medical use as well as for off shore installation with large diameters at the filter arrangement and the sealing arrangements.

The choice of material and mesh size is dependent on the operation environment such as pressure, temperature, type of fluid etc.

The wiper (2) has a lip portion (6) bearing against the rod/piston wall and operates as a wiper as well as leading the fluid into the filter. Inner diameter of the lip portion is produce under sized if it is to be arranged in the cylinder wall and oppositely will a lip portion (6) for a wiper-seal assembly for arrangement at a piston rod be produced over sized, depending on material to gain such function. Fluid is further lead through the filter and then through the conduit, pass the wiper (2) and through the filter and back to the cylinder wall, to ensure an even fluid flow. The wiper-seal assembly according to the invention will at the same time leave a thin fluid film at the same cylinder wall.

Depending of the choice of material and the embodiment the wiper-seal assembly will be more or less elastic. The elasticity and the material choice is essential factors to evaluate with respect to mounting, durability and wear.

The invention claimed is:

1. A wiper-seal assembly for arrangement in a groove of a cylinder wall or a piston wall, comprising: a ring shaped wiper, with-the ring shaped wiper having an outer circumferential wall, an inner circumferential wall, and a pair of radially extending walls extending between the outer circumferential wall and the inner circumferential wall: one or more lip portions extending from one of the outer circumferential wall and/or the inner circumferential wall: a plurality of pressure releasing flow channels at the pair of radially extending walls of the wiper; one or more filters tight-fitting arranged between the wiper and the cylinder wall or the rod/piston rod wall in the groove, arranged for filtering a fluid flowing through, wherein the filter is a flexible filter ring having an inner core ring and one or more enveloping tube rings, and where at least one of the tube rings is arranged to filter the through fluid.

2. The wiper-seal assembly according to claim 1, wherein the cylinder and the piston have a rotating mutual movement.

3. The wiper-seal assembly according to claim 1, wherein the cylinder and the piston have a reciprocal mutual movement.

4. The wiper-seal assembly according to claim 1, wherein the cylinder and the piston have a reciprocal and a rotating mutual movement.

5. The wiper-seal assembly according to claim 1, wherein the groove is arranged in the cylinder wall.

6. The wiper-seal assembly according to claim 1, wherein the groove is arranged in the piston wall.

7. The wiper-seal assembly according to claim 1, wherein the flow channels in a first radially extending wall are offset in a circumferential direction from the channels in a second radially extending wall.

8. The wiper-seal assembly according to claim 1 wherein the inner core ring is shaped like an annular spring arranged to support at least one rim filter.

9. The wiper-seal assembly according to claim 1 wherein the inner core ring is a permeable or semi permeable material with a rim tubing.

10. The wiper-seal assembly according to claim 1, wherein the filter has a circular cross section.

11. The wiper-seal assembly according to claim 1 wherein the inner core ring is hollow.

12. The wiper-seal assembly according to claim 1, wherein the one or more lip portions have a chamfered portion.

13. The wiper-seal assembly according to claim 1, wherein the one or more lip portions is one lip portion.

14. The wiper-seal assembly according to claim 1, wherein the one or more lip portions are two or more lip portions.

15. The wiper-seal assembly according to claim 2, wherein the groove is arranged in the cylinder wall.

16. The wiper-seal assembly according to claim 3, wherein the groove is arranged in the cylinder wall.

17. The wiper-seal assembly according to claim 4, wherein the groove is arranged in the cylinder wall.

18. The wiper-seal assembly according to claim 2, wherein the groove is arranged in the piston wall.

* * * * *